(12) United States Patent
Hori et al.

(10) Patent No.: US 7,658,123 B2
(45) Date of Patent: Feb. 9, 2010

(54) SHIFT RANGE SWITCHING APPARATUS AND METHOD FOR ASSEMBLING THE SAME

(75) Inventors: Masashi Hori, Anjo (JP); Kiyoshi Kimura, Obu (JP); Shigeru Yoshiyama, Kariya (JP); Taku Itoh, Chita-gun (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 256 days.

(21) Appl. No.: 11/508,185

(22) Filed: Aug. 23, 2006

(65) Prior Publication Data

US 2007/0044583 A1 Mar. 1, 2007

(30) Foreign Application Priority Data

Aug. 23, 2005 (JP) ............................. 2005-241773

(51) Int. Cl.
*F16H 59/00* (2006.01)
(52) U.S. Cl. ...................................................... 74/335
(58) Field of Classification Search .................... 74/335
See application file for complete search history.

(56) References Cited

U.S. PATENT DOCUMENTS 5,586,833 A * 12/1996 Vossmann et al. ........ 403/359.6
6,477,910 B2 * 11/2002 Ebashi et al. ................. 74/335
6,877,390 B2 * 4/2005 Tsuzuki et al. ............... 74/335

FOREIGN PATENT DOCUMENTS

JP 2002-323127 11/2002
WO WO 2004090387 A1 * 10/2004

\* cited by examiner

*Primary Examiner*—David D Le
*Assistant Examiner*—Derek D Knight
(74) *Attorney, Agent, or Firm*—Nixon & Vanderhye P.C.

(57) ABSTRACT

A shift range switching apparatus includes an automatic transmission that includes a shift range switching device having a control rod for switching an actual shift range corresponding to rotation angle of the control rod. The shift range switching apparatus further includes an electric actuator that includes an output shaft connecting with the control rod. The electric actuator switches the actual shift range by rotating the control rod via the output shaft. The shift range switching apparatus further includes an assembly regulating device that allows the electric actuator to be detachable from and attachable to the automatic transmission when the actual shift range of the shift range switching device is set at a specific shift range.

23 Claims, 5 Drawing Sheets

SHIFT RANGE SWITCHING APPARATUS AND METHOD FOR ASSEMBLING THE SAME

CROSS REFERENCE TO RELATED APPLICATIONS

This application is based on and incorporates herein by reference Japanese Patent Application No. 2005-241773 filed on Aug. 23, 2005.

FIELD OF THE INVENTION

The present invention relates to a shift range switching apparatus and a method for assembling the shift range switching apparatus.

BACKGROUND OF THE INVENTION

In general, a vehicle having an automatic transmission includes a shift range switching apparatus. A mechanical shift range switching apparatus has a structure, in which a shift range operating device such as a mechanical shift lever has a mechanical linkage with a shift range switching device. In this structure, a target shift range set using the shift range operating device steadily coincides with an actual shift range of the shift range switching device as long as the mechanical linkage does not cause a failure. However, the mechanical shift range switching apparatus may not be necessarily excellent in mountability, flexibility of designing, and the like.

According to JP-A-2002-323127, an electric shift range switching apparatus operates a shift range switching device of an automatic transmission by controlling an electric actuator. A driver switches the shift range via a shift range operating device such as a switch operated via a mechanical shift lever, a button for operating the shift range, and a joystick. In the electric shift range switching apparatus, a mechanical linkage between the shift range operating device and the shift range switching device is omitted, so that mountability of the shift range operating device and the shift range switching device can be enhanced. In addition, the structure of the electric shift range switching apparatus can be further freely and ergonomically designed to enhance controllability of the shift range operating device. Furthermore, a user can freely change the shift range operating device as appropriate.

In the electric shift range switching apparatus, the shift range operating device does not have the mechanical linkage with the shift range switching device. In this structure, the position of the electric actuator is supposed to be matching with the position of the shift range switching device. Accordingly, when the electric actuator actually does not match with the shift range switching device, the target shift range (recognized shift range) may not coincide with the actual shift range. When the target shift range (recognized shift range) does not coincide with the actual shift range, the vehicle may accidentally move by starting the engine even though the driver does not intend to move the vehicle. Therefore, the electric actuator needs to coincide with the shift range switching device to steadily restrict the vehicle from accidentally moving by starting the engine.

According to JP-A-2002-323127, a memory such as a nonvolatile memory stores the actual shift range (previous shift range) when the engine is stopped. Subsequently, the previous shift range is recognized as the present actual shift range when the engine is started. However, the electrical actuator may be detached and attached for maintenance work or the like. The actual shift range may be changed while the electrical actuator is detached. In this condition, deviation may arise between the recognized shift range recognized by an electric actuator control device and the actual shift range. In this case, the vehicle may accidentally move by starting the engine even though the driver does not intend to move the vehicle.

SUMMARY OF THE INVENTION

The present invention addresses the above disadvantage. According to one aspect of the present invention, a shift range switching apparatus includes an automatic transmission that includes a shift range switching device having a control rod for switching an actual shift range corresponding to rotation angle of the control rod. The shift range switching apparatus further includes an electric actuator that includes an output shaft connecting with the control rod. The electric actuator switches the actual shift range by rotating the control rod via the output shaft. The shift range switching apparatus further includes an assembly regulating device that allows the electric actuator to be detachable from and attachable to the automatic transmission when the actual shift range of the shift range switching device is set at a specific shift range.

Alternatively, a shift range switching apparatus includes an automatic transmission that includes a shift range switching device having a control rod for switching a shift range corresponding to rotation angle of the control rod. The automatic transmission is accommodated in a transmission housing. The shift range switching apparatus further includes an electric actuator that includes an output shaft connecting with the control rod. The electric actuator is accommodated in an actuator housing. The electric actuator switches the shift range by rotating the control rod via the output shaft. The shift range switching apparatus further includes an assembly regulating device that allows the electric actuator to be detachable from and attachable to the automatic transmission when angular positions of all the transmission housing, the actuator housing, the control rod, and the output shaft are at a specific angular position that corresponds to a specific shift range.

A method for assembling a shift range switching apparatus includes storing a position of a shift range of an automatic transmission in a memory. The method further includes terminating electricity supplied to a controller that controls an electric actuator for operating a shift range switching device to switch the shift range of the automatic transmission. The method further includes detaching the automatic transmission from the electric actuator by correspondingly removing a transmission housing and a control rod of the shift range switching device from an actuator housing and an output shaft of the electric actuator. The method further includes adjusting angular positions of all the transmission housing, the actuator housing, the control rod, and the output shaft at a specific angular position that corresponds to a specific shift range. The method further includes attaching the automatic transmission to the electric actuator by correspondingly connecting the transmission housing and the control rod with the actuator housing and the output shaft. The method further includes resuming electricity supply to the controller. The method further includes restoring the position of the shift range stored in the memory.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Figure 1:
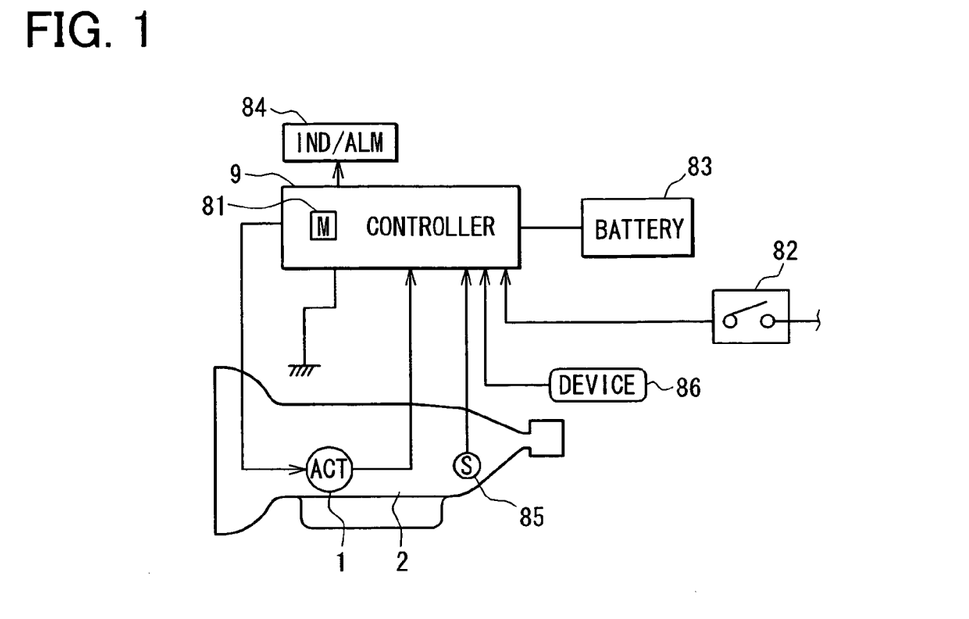
FIG. 1 is a schematic diagram showing a system of a shift range switching apparatus according to an embodiment.

As follows, a shift range switching apparatus is described in reference to FIGS. 1 to 3. The shift range switching apparatus switches an actual shift range of a shift range switching device 3 using an electric actuator 1. The shift range switching device 3 is provided to an automatic transmission 2 (FIG. 1). The shift range switching device 3 includes parking device 4 (FIG. 3).

The electric actuator 1 is a servo device that operates the shift range switching device 3. The electric actuator 1 includes a synchronous electric motor 5, reduction gears 6, a rotor angle detecting unit 7, and an output angle detecting unit 8. The reduction gears 6 reduce rotation speed of the electric motor 5 so that the reduction gears 6 operate the shift range switching device 3. The rotor angle detecting unit 7 detects rotation angle of the electric motor 5. Specifically, the rotor angle detecting unit 7 detects rotor angle of a rotor 11. The output angle detecting unit 8 detects output angle of the reduction gears 6 corresponding to an actual shift range. The electric motor 5 operates the shift range switching device 3 via the reduction gears 6. The electric motor 5 is controlled using a motor control device (motor controller) 9. Specifically, the motor control device 9 controls the rotative direction of the electric motor 5, the rotation speed (number of rotation) of the electric motor 5, and rotation angle of the electric motor 5.

The motor control device 9 switches the shift range switching device 3 and the parking device 4 via the reduction gears 6 by controlling the electric motor 5 in the shift range switching apparatus. Thus, the motor control device 9 operates the actual shift range of the automatic transmission 2 and sets the automatic transmission 2 at a parking condition, in which an output shaft of the automatic transmission 2 is locked.

Figure 2:
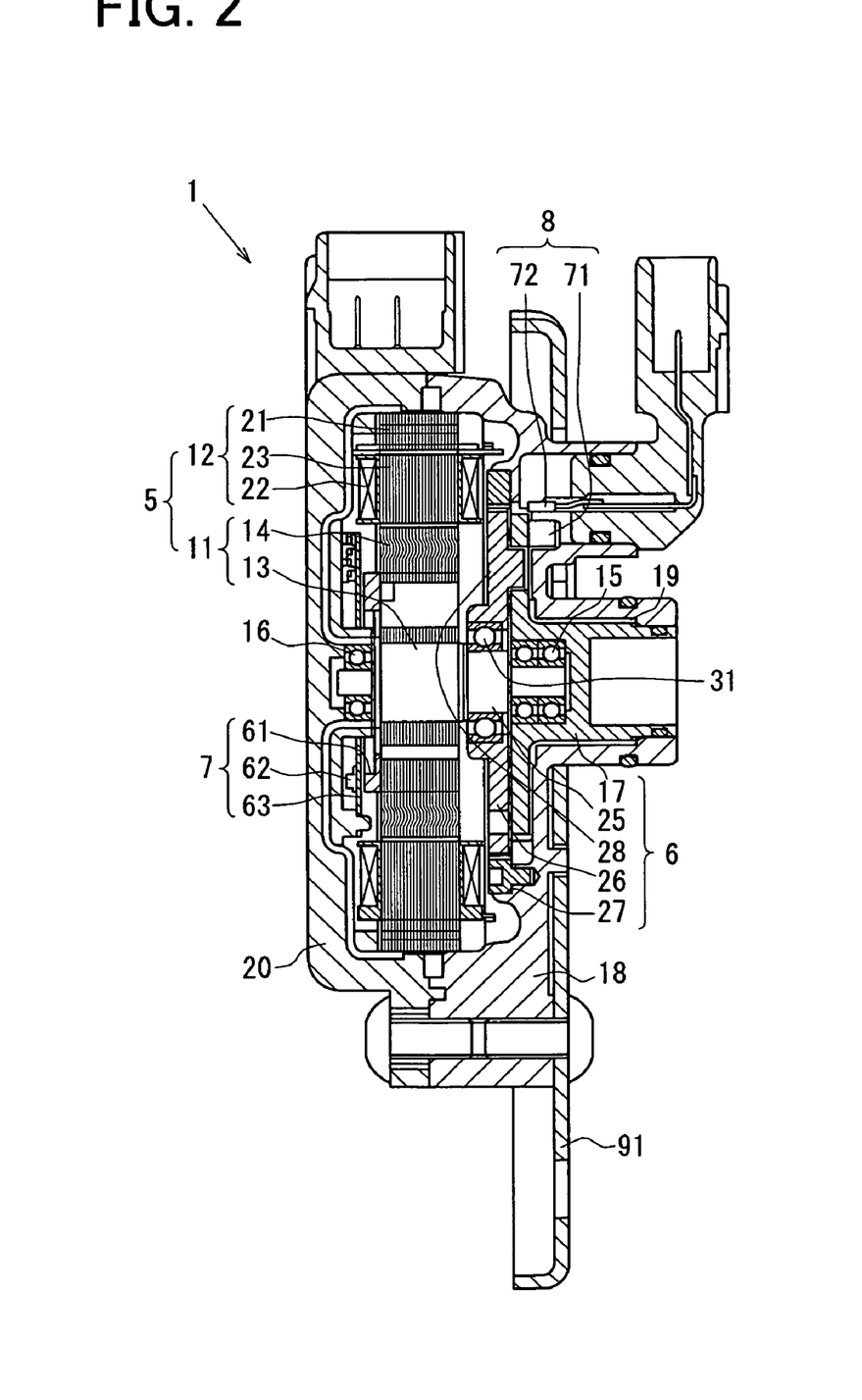
FIG. 2 is a longitudinal partially sectional view showing an electric actuator of the shift range switching apparatus according to the embodiment.
Figure 3:
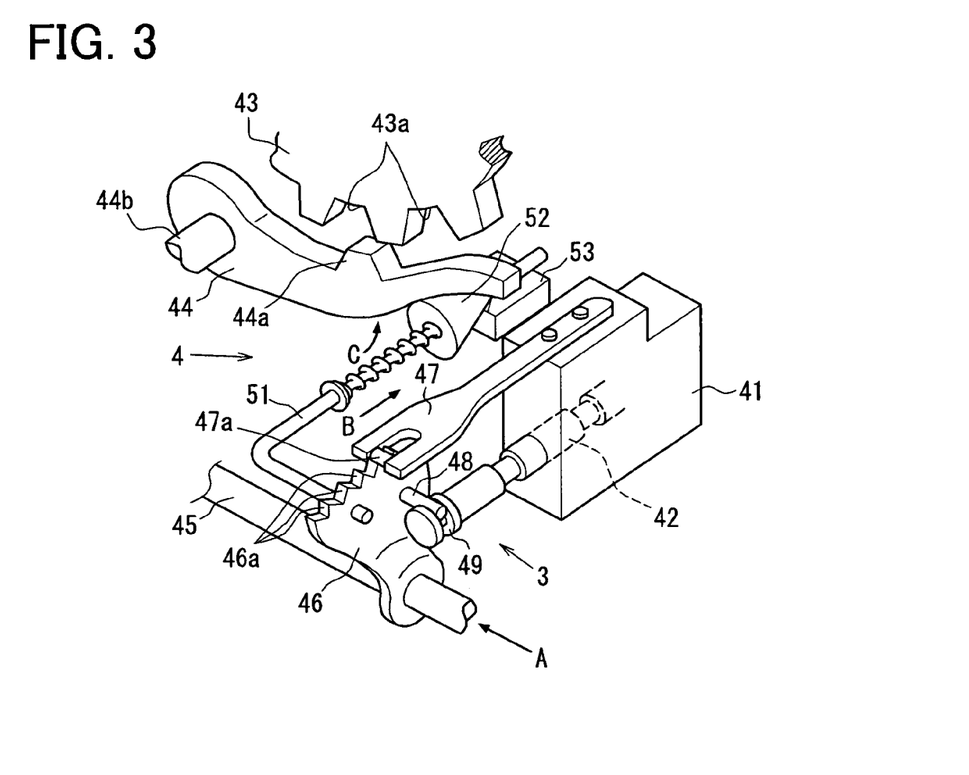
FIG. 3 is a perspective view showing the shift range switching apparatus according to the embodiment.
Figure 4A:
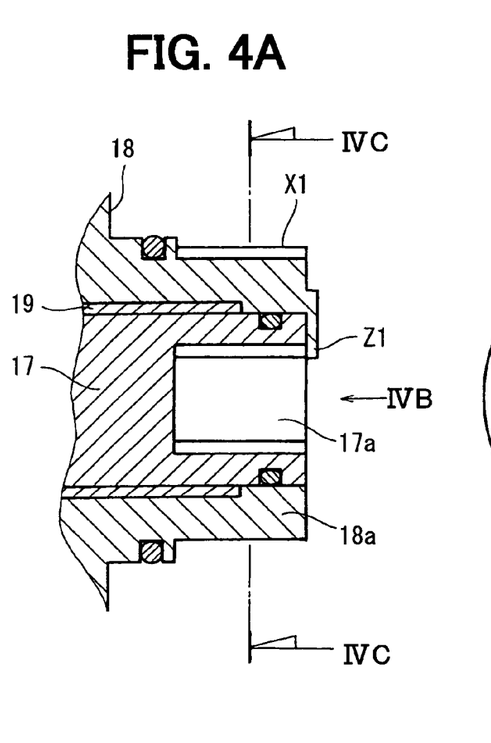
FIG. 4A is a sectional view showing a connecting portion of the electric actuator.
Figure 4B:
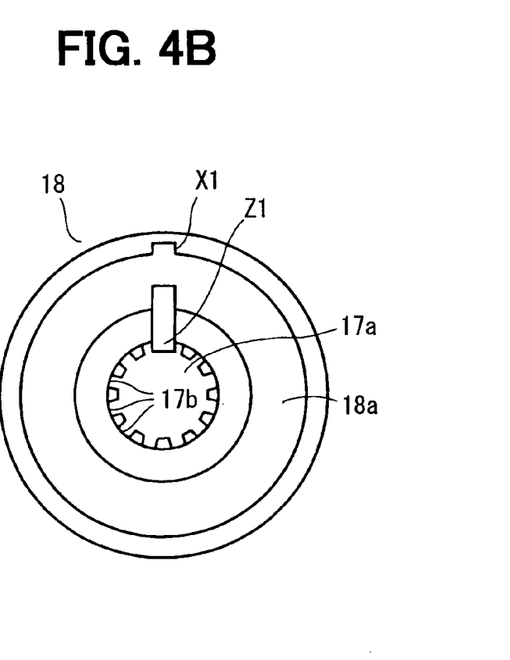
FIG. 4B is a view when being viewed from the arrow IVB in FIG. 4A.
Figure 4C:
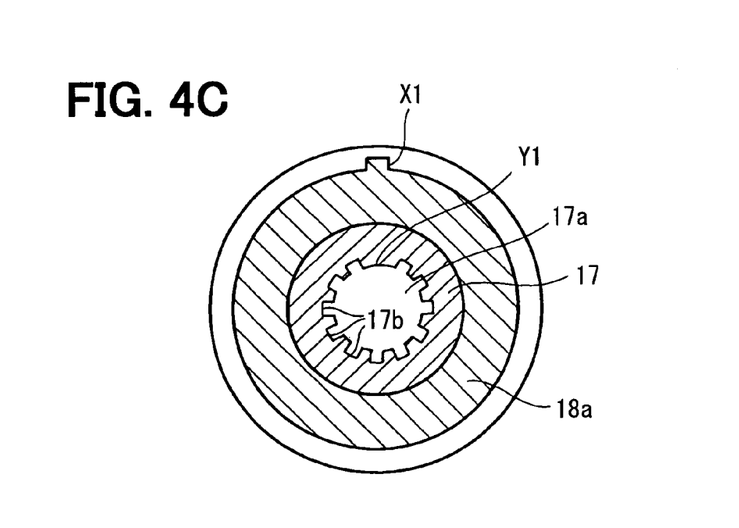
FIG. 4C is a sectional view taken along the line IVC-IVC in FIG. 4A.
Figure 5A:
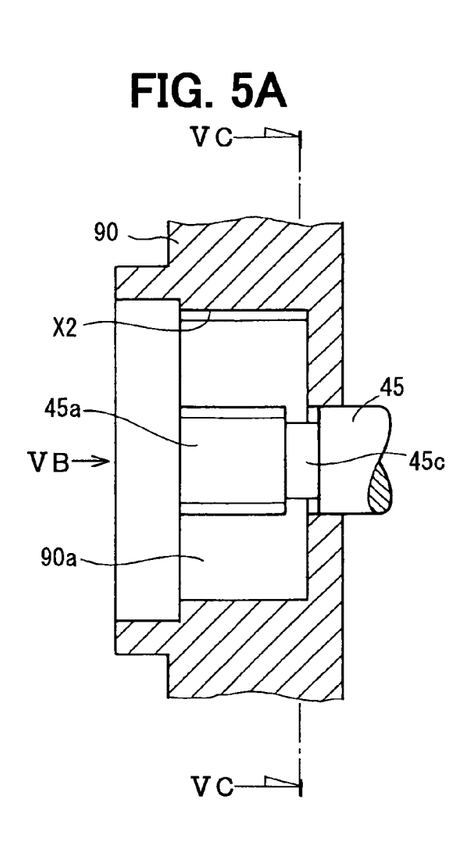
FIG. 5A is a sectional view showing a connecting portion of a shift range switching device provided to an automatic transmission.
Figure 5B:
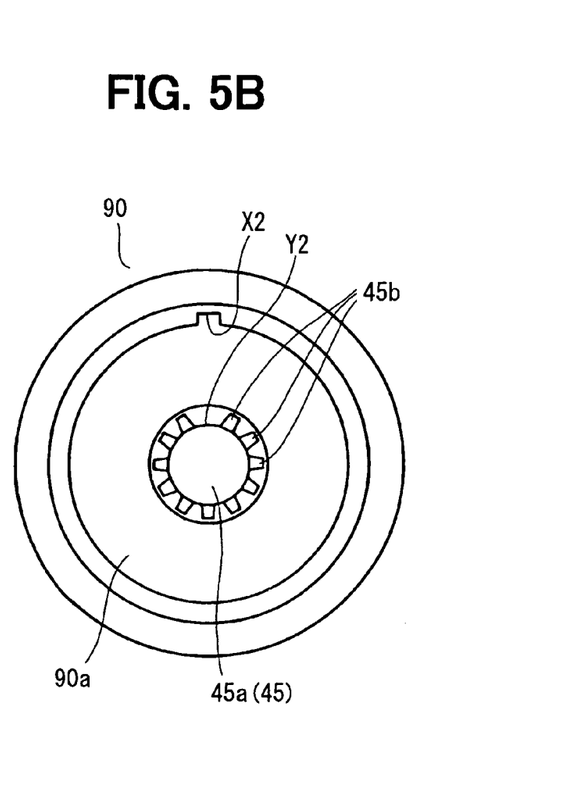
FIG. 5B is a view when being viewed from the arrow VB in FIG. 5A.
Figure 5C:
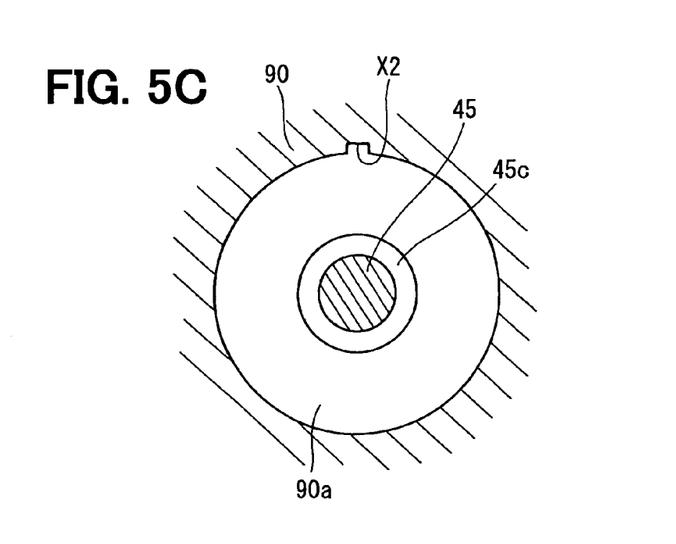
FIG. 5C is a sectional view taken along the line VC-VC in FIG. 5A.
Figure 6A:
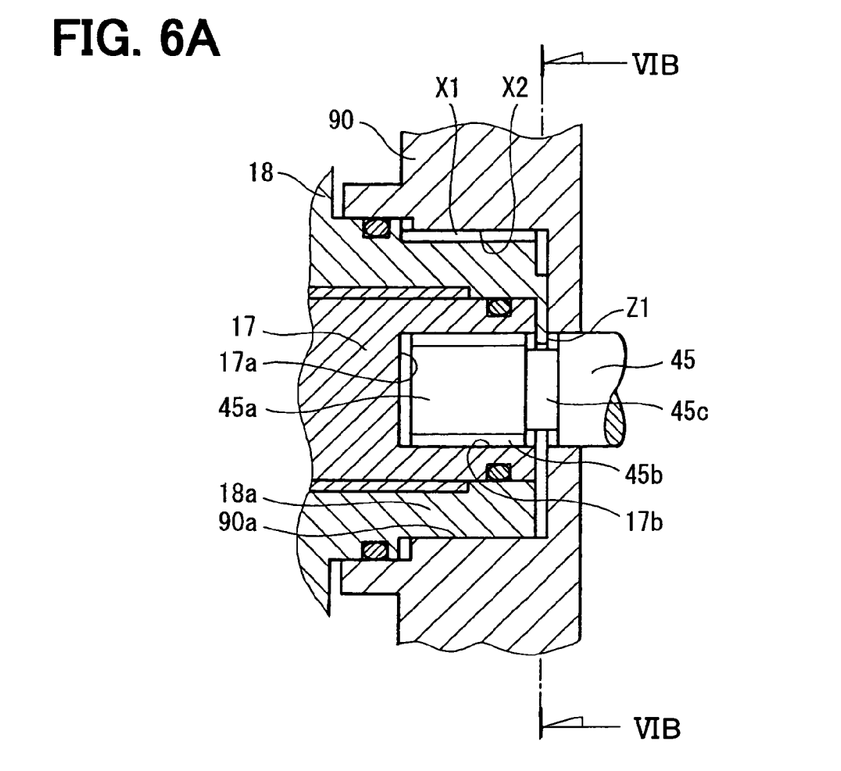
FIG. 6A is a partially sectional view showing the connecting portions of both the electric actuator and the shift range switching device, which are connected with each other.
Figure 6B:
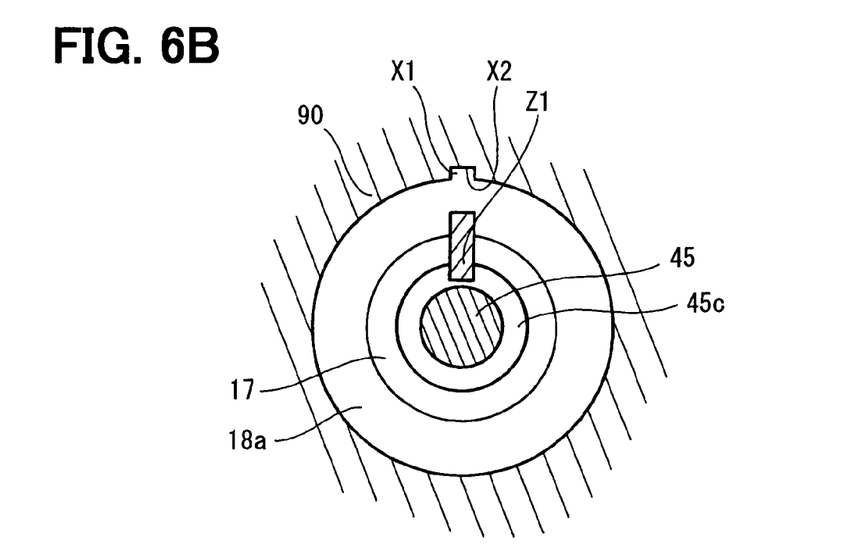
FIG. 6B is a sectional view taken along the line VIB-VIB in FIG. 6A.

In the following description, the right side in FIG. 2 is defined as a front side, and the left side in FIG. 2 is defined as a rear side.

The electric motor 5 is a blushless switched reluctance motor (SR motor), in which a permanent magnet is not used. The electric motor 5 includes a rotor 11 and a stator 12. The rotor 11 is rotatable. The stator 12 is arranged coaxially with respect to the rotation center of the rotor 11.

The rotor 11 is constructed of a rotor shaft 13 and a rotor core 14. The rotor shaft 13 is rotatably supported using a front ball bearing 15 and a rear ball bearing 16. The front ball bearing 15 is provided to a front end of the rotor shaft 13. The rear ball bearing 16 is provided to a rear end of the rotor shaft 13.

The front ball bearing 15 engages with the inner circumferential periphery of an output shaft 17 of the reduction gears 6. The output shaft 17 of the reduction gears 6 is rotatably supported via a metal bearing 19, which is arranged in the inner circumferential periphery of the front housing 18. That is, the front end of the rotor shaft 13 is rotatably supported via the metal bearing 19, the output shaft 17, and the front ball bearing 15, which are provided in a front housing 18.

The rear ball bearing 16 is press-inserted onto the outer circumferential periphery of the rear end of the rotor shaft 13, thereby being supported by a rear housing 20.

The front housing 18 and the rear housing 20 construct the housing (electric actuator housing) of the electric actuator 1.

The stator 12 is constructed of a fixed stator core 21 and magnetizing coils 22. The coil devices 22 respectively generate magnetic force by being energized. Each of the coil devices 22 is a multiphase coil.

As referred to FIG. 2, the stator core 21 is constructed of stacked thin plates. The stator core 21 is fixed to the rear housing 20. The stator core 21 has stator teeth 23 (introverted salient poles) that protrude inwardly toward the rotor core 14. The stator teeth 23 are arranged at substantially regular circumferential intervals, which are substantially 30°, for example. Each coil corresponding to each phase of the coil devices 22 is wound around each of the stator teeth 23 to generate magnetic force in each of the stator teeth 23.

The rotor core 14 is constructed by stacking thin plates. The rotor core 14 is press-inserted into and fixed to the rotor shaft 13. The rotor core 14 has rotor teeth (extroverted salient poles) that outwardly protrude to the stator core 21 on the radially outer side thereof. The rotor teeth are arranged at substantially regular circumferential intervals, which are substantially 45°, for example.

The energizing position and the energizing direction of the each phase of the coil devices 22 are sequentially switched, so that the stator teeth 23, which magnetically attract the rotor teeth, are switched. Thus, the rotor 11 is rotated in both the normal direction and the reverse direction.

In this example embodiment, the reduction gears 6 are cycloidal gears, for example. The reduction gears 6 are some type of a planetary gear train, which constructs an inscribed planetary gear reduction mechanism. The reduction gears 6 include a sun gear 26 (inner gear, external gear), a ring gear 27 (outer gear, internal gear), and a transmission device 28. The sun gear 26 is adapted to rotating eccentrically with respect to the rotor shaft 13 via an eccentric axis 25, which is provided to the rotor shaft 13. The ring gear 27 internally engages with the sun gear 26. The transmission device 28 transmits rotation of the sun gear 26 to the output shaft 17.

The eccentric axis 25 rotates eccentrically with respect to the rotation center of the rotor shaft 13, thereby rotating the sun gear 26 along an orbital path. The eccentric axis 25 rotatably supports the sun gear 26 via a sun gear bearing 31, which is provided to the circumferential outer periphery of the eccentric axis 25.

As described above, the sun gear 26 is rotatably supported via the sun gear bearing 31 such that the sun gear 26 is rotatable with respect to the eccentric axis 25 of the rotor shaft 13. As the eccentric axis 25 rotates, the sun gear 26 is rotated in a condition, in which the sun gear 26 is pressed onto the ring gear 27. The ring gear 27 is fixed to the front housing 18.

Next, the shift range switching device 3 and the parking device 4 are described in reference to FIG. 3.

The shift range switching device 3 is operated via the output shaft 17 (FIG. 2) of the reduction gears 6, so that the shift range switching device 3 switches the actual shift range of the automatic transmission 2.

A manual spool valve 42 is provided to a hydraulic pressure controller 41. The manual spool valve 42 is slid and displaced to a predetermined position, so that hydraulic passages are switched. The hydraulic passages are connected to a hydraulic clutch (not shown) of the automatic transmission 2. Thus, the engagement condition of the hydraulic clutch is controlled, so that the shift ranges such as P, R, N, and D in the automatic transmission 2 are switched.

The parking device 4 mechanically locks the output shaft of the automatic transmission 2 when the actual shift range is set at the parking range (P) in conjunction with the shift range switching device 3. The parking device 4 locks and unlocks the output shaft of the automatic transmission 2 by engagement and disengagement between a recession 43*a* of a park gear 43 and a protrusion 44*a* of the park pole 44. The park gear 43 connects with the output shaft of the automatic transmission 2 via a driveshaft (not shown) and a differential gear (not shown). The output shaft of the automatic transmission 2 on the side of the drive wheel of the vehicle is locked by restricting rotation of the park gear 43. Thus, the vehicle is in the parking condition.

A control rod 45 is driven using the reduction gears 6. A detent plate 46, which is in a substantially sector form, is fixed to the control rod 45 via a spring pin or the like (not shown).

The detent plate 46 has multiple detent grooves 46*a* in the radially tip end thereof. The radially tip end of the detent plate 46 defines an arc shaped portion in the sector-shaped portion. A detent spring 47 is fixed to the hydraulic pressure controller 41. The detent spring 47 has a hooking portion 47*a* in the tip end thereof. The hooking portion 47*a* hooks to one of the detent grooves 46*a* of the detent plate 46, so that the shift range is maintained.

The detent plate 46 is provided with a pin 48 for operating the manual spool valve 42. The pin 48 engages with a groove 49 that is formed in the end of the manual spool valve 42. When the detent plate 46 is rotated via the control rod 45, the pin 48 is moved along an arch-shaped path, so that the manual spool valve 42, which engages with the pin 48, linearly moves in the hydraulic pressure controller 41.

When the control rod 45 is rotated in the clockwise direction with respect to the direction when being viewed from the arrow A in FIG. 3, the pin 48 pushes the manual spool valve 42 into the hydraulic pressure controller 41 via the detent plate 46. Thus, the hydraulic passages in the hydraulic pressure controller 41 are switched in the order corresponding to D, N, R, and P range, so that the shift range of the automatic transmission 2 is switched in the order of D, N, R, and P range. When the control rod 45 is rotated in the reverse direction, the pin 48 pulls the manual spool valve 42 from the hydraulic pressure controller 41, so that the hydraulic passages in the hydraulic pressure controller 41 are switched in the order corresponding to P, R, N, and D range. Thus, the shift range of the automatic transmission 2 is switched in the order of P, R, N, and D range.

The detent plate 46 is provided with a park rod 51 for operating the park pole 44. The park rod 51 has a tip end, to which a conical portion 52 is provided.

The conical portion 52 is interposed between a protrusion 53 of the housing of the automatic transmission 2 and the park pole 44. When the control rod 45 is rotated from the R range to the P range in the clockwise direction with respect to the direction when being viewed from the arrow A in FIG. 3, the park rod 51 is displaced via the detent plate 46 in the direction shown by arrow B in FIG. 3. Thus, the conical portion 52 raises the park pole 44, so that the park pole 44 rotates around a shaft 44*b* in the direction shown by the arrow C in FIG. 3. Thus, the protrusion 44*a* of the park pole 44 engages with the recession 43*a* of the park gear 43. In this condition, the parking device 4 is in a lock condition.

When the control rod 45 is rotated from the P range to the R range in the counterclockwise direction, the park rod 51 is pulled in the direction opposite to the arrow B in FIG. 3, so that the conical portion 52 terminates raising the park pole 44. The park pole 44 is regularly biased using a spring (not shown) in the direction opposite to the arrow C in FIG. 3, so that the protrusion 44*a* of the park pole 44 is detached from the recession 43*a* of the park gear 43. In this condition, the park gear 43 is free from the park pole 44, so that the parking device 4 is set to be in an unlock condition.

As referred to FIG. 2, the electric actuator 1 has the housing, which is constructed of the front housing 18 and the rear housing 20. The housing of the electric actuator 1 accommodates the rotor angle detecting unit 7 that detects the rotation angle of the rotor 11. The rotor angle detecting unit 7 detects the rotation angle of the rotor 11, and electricity supply to the coil device 22 is switched, so that the electric motor 5 can be rotated at high speed while maintaining synchronism.

In this example embodiment, the rotor angle detecting unit 7 is an incremental encoder. The rotor angle detecting unit 7 includes a magnet 61 and a hall IC 62. The magnet 61 rotates integrally with the rotor 11. The hall IC 62 is arranged in the rear housing 20 for detecting magnetism. The hall IC 62 may be constructed of multiple devices. The hall IC 62 is supported using a substrate 63 located in the rear housing 20.

The magnet 61 is in a substantially annular disc shape, and is provided coaxially with the rotor shaft 13. The magnet 61 connects with the axial end surface (rear surface) on the rear side of the rotor core 14. The magnet 61 has the rear end surface, which is opposed to the hall IC 62. The rear end surface of the magnet 61 is magnetized for detecting the rotation angle. The magnet 61 generates magnetism substantially along the axial direction of the magnet 61.

As the rotor 11 rotates, the magnetized portion of the magnet 61 rotates, so that the density of the magnetic flux passing through the linear output hall IC 62, which faces to the magnet 61, changes. Thus, the hall IC 62 generates an output waveform corresponding to rotation of the rotor 11.

The electric actuator 1 includes the output angle detecting unit 8 that detects angle (output angle) of the output shaft 17. The motor control device 9 detects the actual shift range such as P, R, N, and D, which are set using the shift range switching device 3, in accordance with the angle of the output shaft 17. The angle of the output shaft 17 is detected using the output angle detecting unit 8.

In this example embodiment, the output angle detecting unit 8 detects the angle of the output shaft 17 as a continuous quantity. The output angle detecting unit 8 is constructed of a magnet 71 and a linear output hall IC 72. The magnet 71 rotates integrally with the output shaft 17. The linear output hall IC 72 is fixed to the front housing 18.

The magnet 71 is in a substantially crescentic form when being viewed in the axial direction of the output shaft 17. The magnet 71 is magnetized such that magnetic flux generated by the magnet 71 perpendicularly crosses the linear output hall IC 72. The distance between the magnet 71 and the linear output hall IC 72 changes within the rotative range of the output shaft 17, so that the density of the magnetic flux passing through the linear output hall IC 72 changes. The angle of the output shaft 17 is detected in accordance with the density of the magnetic flux passing through the linear output hall IC 72.

Next, the motor control device (controller) 9 is described in reference to FIG. 1. The motor control device 9 controls electricity supplied to the electric motor 5. The motor control device 9 is a microcomputer including a CPU, a storage unit 81, an input circuit, an output circuit, an electric power source, and the like. The CPU executes control processings and arithmetic processings. The storage unit 81 is a memory such as a ROM, an EEPROM, an SRAM, and a RAM that stores programs and data. The EEPROM is a memory adapted to storing data even when supplying electricity to the EEPROM is terminated. The SRAM is a memory adapted to storing data by being supplied with a small amount of electricity.

The motor control device 9 is electrically connected with devices such as a start switch (ignition switch, accessory switch) 82, an in-vehicle battery 83, an indicating and alarm unit 84, a vehicular speed sensor 85, and a device 86. The indicating and alarm unit 84 displays information such as a condition of the automatic transmission 2, e.g., the actual shift range of the automatic transmission 2 and the electric actuator 1. The indicating and alarm unit 84 may include a device such as a visual display device, a warning light, and a warning sound device in a normal operation. The device 86 may include a switch or a sensor for a shift range operating unit manipulated by the driver. The device 86 may include a sensor for detecting a vehicular condition such as a position of a brake switch that is for evaluating whether a brake is operated for decelerating the vehicle.

When the start switch 82 is turned ON, the battery 83 supplies electricity to the motor control device 9, so that the motor control device 9 performs various control processings. When the start switch 82 is turned OFF, the battery 83 stops supplying electricity to the motor control device 9 after performing a predetermined power OFF processing. That is, electricity supply is started by turning the start switch 82 ON, and the electricity supply is terminated by turning the start switch 82 OFF.

The motor control device 9 includes various control programs such as a rotor angle determining unit, an output angle determining unit, and a normal control unit. The rotor angle determining unit determines the rotative direction of the rotor 11, the rotation speed of the rotor 11, the rotation amount of the rotor 11, and the rotation angle of the rotor 11, in accordance with the output signal of the rotor angle detecting unit 7. The output angle determining unit determines the angle of the output shaft 17 in accordance with the output signal of the output angle detecting unit 8. The normal control unit controls the electric motor 5 such that a shift range command signal coincides with the actual shift range detected and recognized by the motor control device 9. The shift range command signal corresponds to a target shift range that is set by a shift range setting unit.

The normal control unit operates of the electric motor 5 when a deviation exists between the target shift range, which is set by the shift range setting unit, and a recognized shift range, which is recognized by the motor control device 9. More specifically, the normal control unit determines the rotative direction of the electric motor 5, the rotation speed of the electric motor 5, the rotation amount of the electric motor 5, and the rotation angle of the electric motor 5, in accordance with the deviation between the target shift range and the recognized shift range. Thus, the motor control unit controls supplying electricity to the coil device 22 of the electric motor 5 in accordance with the determination such that the target shift range, which is set by the shift range setting unit, coincides with the recognized actual shift range, which is recognized by the motor control device 9.

As follows, a structure of a mechanical shift range switching apparatus is described. In a mechanical shift range switching apparatus, a shift range switching device switches an actual shift range of the automatic transmission via a mechanical linkage. The actual shift range is a position of the shift range actually set for the automatic transmission. The mechanical shift range device detects the actual shift range using a detection unit (mechanical contact switch) having a mechanical contacts.

In this mechanical shift range switching apparatus, output power of the engine is transmitted to driving wheels via the automatic transmission when the actual shift range is at a cruising range such as D, R ranges. Therefore, starting the engine should be allowed only when the actual shift range is in a non-cruising range such as P, N ranges in order to restrict the vehicle from accidentally moving contrary to intension of the driver.

In the above mechanical contact switch, contact points corresponding to the one of the P, R, N, and D ranges are electrically conductive for detecting the actual shift range. A power supply circuit supplies electricity to a starter of the engine. A relay having a coil is provided to the power supply circuit. The coil of the relay is supplied with electricity only when the contact points of the mechanical contact switch corresponding to the non-cruising range such as P, N ranges are electrically conductive. Accordingly, in this mechanical shift range switching apparatus, the starter cannot be activated when the mechanical contact switch causes a defect such as a contact failure and disconnection of a harness. The starter cannot be activated excluding the case where the actual shift range is set at either one of the non-cruising ranges including P, N ranges, for example. This mechanical shift range switching apparatus, which switches the actual shift range via the mechanical linkage, has a structure for restricting the vehicle from accidentally moving contrary to intension of the driver.

By contrast, the electric shift range switching apparatus in this example embodiment, a shift range operating device such as a shift lever does not have the mechanical linkage with the shift range switching device 3.

As described above, when a deviation exists between the target shift range and the recognized shift range, the motor control device 9 controls the electric motor 5 in accordance with the deviation between the target shift range and the recognized shift range such that the target shift range coincides with the recognized shift range.

A deviation, i.e. mismatching may exist between the recognized shift range, which is recognized by the shift range switching device 3, and the actual shift range, which is actually set by the shift range switching device 3, due to unexpected reason such as detachment of the electric actuator for maintenance. If such a deviation exists, the actual shift range may be at a running shift range such as D, R range, even when the target shift range coincides with the recognized shift range at a non-running range such as P, N range. In this case, when the engine is started by operating the starter, the vehicle may accidentally start moving.

As follows, a further specific example is described. The motor control device 9 includes a startup shift range recognizing unit for recognizing the actual shift range in the present condition. Specifically, when the start switch 82 is turned OFF, the memory such as an EEPROM, SRAM provided to the storage unit 81 stores the recognized shift range (actual shift range, previous shift range) recognized during the vehicle stops. This operation may correspond to the predetermined power OFF processing. Subsequently, supplying electricity to the motor control device 9 is terminated. Afterwards, the start switch 82 is turned ON, so that electricity is supplied to the motor control device 9. In this condition, the startup shift range recognizing unit recognizes the present position of the shift range as the actual shift range by loading the previous shift range from the memory. The previous shift range is stored when the start switch 82 is previously turned OFF.

Accordingly, deviation may arise between the previous shift range (recognized shift range) stored in the memory and the actual shift range when the electrical actuator 1 is once detached, and is attached again. Specifically, the electrical actuator 1 may be detached and attached for maintenance or the like. During the electrical actuator 1 is detached, the output shaft 17 may be rotated or the actual shift range of the shift range switching device 3 may be changed. In these conditions, deviation may arise between the previous shift range and the actual shift range. Accordingly, the vehicle needs to be restricted from accidentally starting even when the electric actuator 1 is detached and attached and the deviation is caused between the previous shift range and the actual shift range.

In this example embodiment, the shift range switching apparatus has a structure such that the electric actuator 1 cannot be attached to the automatic transmission 2 when the output shaft 17 is rotated or the actual shift range of the shift range switching device 3 is changed while the electrical actuator 1 is detached. Specifically, in this example embodiment, the shift range switching apparatus includes an assembly regulating device. The assembly regulating device allows the electric actuator 1 to be attached and detached only when the actual shift range of the shift range switching device 3 is in a specific shift range such as the P range. The P range is an example of the specific shift range.

As follows, an example of the assembly regulating device is described in reference to FIGS. 4A to 6B. The assembly regulating device allows the electric actuator 1 to be attached to and detached from the automatic transmission 2 only when four devices, which include a transmission housing 90, a front housing 18, the control rod 45, and the output shaft 17, are in a specific angle with respect to the center axes of the output shaft 17 and the control rod 45. The specific angle corresponds to the specific shift range such as the P range. The transmission housing 90 (FIG. 5A) of the automatic transmission 2 accommodates the shift range switching device 3. The front housing 18 (FIG. 2) accommodates the electric actuator 1. The front housing 18 and the rear housing 20 construct the electric actuator housing.

The assembly regulating device is constructed of first, second, and third regulating devices. The first regulating device allows the transmission housing 90 to be attached to the front housing 18 only in a predetermined position. The second regulating device allows the control rod 45 to be attached to the output shaft 17 only at a specific predetermined angle. The control rod 45 and the output shaft 17 have a spline engagement structure (non-tooth and non-groove structure), in which the control rod 45 is engaged with the output shaft 17 by matching a non-groove portion Y1 with a non-tooth portion Y2. That is, the control rod 45 and the output shaft 17 are engaged with each other via a spline. The third regulating device is provided to a housing such as the front housing 18 to which the non-groove portion Y1 is provided. The third regulating device regulates the position of the non-tooth portion Y2 that is inserted.

As follows, an assembly structure between the electric actuator 1 and the automatic transmission 2 is described. The electric actuator 1 is assembled to the automatic transmission 2 by constructing the housings and the drive shaft. Specifically, the front housing 18 of the electric actuator 1 is connected with the transmission housing 90 accommodating the shift range switching device 3, and the output shaft 17 is connected with the control rod 45, so that the electric actuator 1 is assembled to the automatic transmission 2.

The front housing 18 includes a boss 18a that is in a substantially cylindrical shape. The boss 18a surrounds the periphery of the output shaft 17 on the front side thereof. The transmission housing 90 has an assembly hole 90a that is a substantially cylindrical bore. The boss 18a of the front housing 18 is axially inserted into the assembly hole 90a. The boss 18a of the front housing 18 is inserted into the assembly hole 90a of the transmission housing 90, and a connection plate 91 (FIG. 2) fixed to the front housing 18 is screwed to the transmission housing 90 using a screw such as a bolt, so that the electric actuator 1 is fixed to the automatic transmission 2.

The end of the output shaft 17 on the front side thereof has a connection hole 17a that is a substantially cylindrical bore. The control rod 45 has a connection end 45a that is axially inserted into the connection hole 17a. The connection hole 17a of the end of the output shaft 17 is defined with an inner periphery that is formed with multiple spline grooves 17b. Each of the spline grooves 17b axially extends. The connection end 45a of the control rod 45 is located in the assembly hole 90a. The connection end 45a has the outer periphery that is provided with multiple spline teeth 45b. Each of the spline teeth 45b axially extends. The spline teeth 45b can be engaged with the spline grooves 17b.

The connection end 45a is inserted into the connection hole 17a, and the spline grooves 17b are engaged with the spline teeth 45b when the boss 18a of the front housing 18 is inserted into the assembly hole 90a of the transmission housing 90. Thus, the output shaft 17 is engaged with the control rod 45 via a spline connection.

The first regulating device allows the boss 18a of the front housing 18 to be connected with the assembly hole 90a of the transmission housing 90 only in the predetermined position. The first regulating device is constructed of a key X1 and a key groove X2. The key X1 is a protrusion that axially extends on the outer periphery of the boss 18a. The key groove X2 is a recession that axially extends on the inner periphery defining the assembly hole 90a in the transmission housing 90. In this structure, the boss 18a (electric actuator housing) cannot be assembled to the transmission housing 90 without matching the key X1 with the key groove X2.

Next, the second regulating device is described. The control rod 45 is engaged with the output shaft 17 via the spline connection. The second regulating device has the spline engagement structure, in which the non-tooth portion Y2 is engaged with the non-groove portion Y1. Therefore, the second regulating device allows the control rod 45 to be connected with the output shaft 17 only at the specific predetermined angle.

The spline grooves 17b provided to the output shaft 17 are arranged at substantially regular intervals excluding the non-groove portion Y1. For example, one of the spline grooves 17b is omitted from the regularly arrangement of the spline grooves 17b to define the non-groove portion Y1.

The spline teeth 45b provided to the control rod 45 are arranged corresponding to the spline grooves 17b. The spline teeth 45b are arranged at substantially regular intervals excluding the non-tooth portion Y2. For example, one of the spline teeth 45b is omitted from the circumferentially regularly arranged spline teeth 45b to define the non-tooth portion Y2.

In this structure, the control rod 45 cannot be engaged with the output shaft 17 via the spline connection without matching the non-groove portion Y1 with the non-tooth portion Y2.

The third regulating device is provided to the housing to which the non-groove portion Y1 is provided. In this example embodiment, the third regulating device is provided to the front housing 18. Specifically, the third regulating device is a latching piece (stopper) Z1 for regulating the insertion position of the non-tooth portion Y2 when the spline teeth 45b of the control rod 45 are inserted to the spline grooves 17b of the output shaft 17. The latching piece Z1 is formed on the end of the boss 18a. Alternatively, the latching piece Z1 is fixed to the end of the boss 18a by welding or the like.

The latching piece Z1 is located at a position corresponding to the non-groove portion Y1 when the rotative angle of the output shaft 17 is set at a rotative angle, which corresponds to the P range. In this structure, the electric actuator 1 can be attached and detached only when the target range of the electric actuator 1 is set at the P range and the actual shift range of the shift range switching device 3 is also set at the P range.

In this example embodiment, the key X1 and the latching piece Z1 are arranged substantially in the same direction (substantially in the same angular position) when being viewed in the axial direction of the output shaft 17. The electric actuator 1 can be attached to and detached from the automatic transmission 2 only by aligning three devices on the side of the electric actuator 1 and two devices on the side of the automatic transmission 2 to be in substantially the same direction corresponding to the P range. The three devices on the side of the electric actuator 1 include the key X1, the latching piece Z1, and the non-groove portion Y1. The two devices on the side of the automatic transmission 2 include the key groove X2 and the non-tooth portion Y2.

The control rod 45 has an annular groove 45c. The annular groove 45c restricts the latching piece Z1 from making contact with the control rod 45 when the control rod 45 is rotated in a condition in which the output shaft 17 is engaged with the control rod 45 via the spline connection.

In the shift range switching apparatus of this example embodiment, the electric actuator 1 and the automatic transmission 2 are restricted in position using the assembly regulating device including the first to third regulating devices. Therefore, the electric actuator 1 can be attached to and detached from the automatic transmission 2 only when the angular position of the output shaft 17 of the electric actuator 1 is set at the P range and the actual shift range of the shift range switching device 3 is also set at the P range. In this structure, the angular position of the output shaft 17 of the electric actuator 1 steadily corresponds to the P range that coincides with the actual shift range of the shift range switching device 3 when the electric actuator 1 is detached from and attached to the automatic transmission 2.

When the output shaft 17 is not rotated and the actual shift range of the shift range switching device 3 is not changed during the electrical actuator 1 is detached, the angular position of the output shaft 17 of the electric actuator 1 corresponds to the P range that coincides with the actual shift range of the shift range switching device 3. Therefore, the electrical actuator 1 can be attached to the automatic transmission 2. However, when the output shaft 17 is rotated or the actual shift range of the shift range switching device 3 is changed during the electrical actuator 1 is detached, the electrical actuator 1 is prohibited from being attached to the automatic transmission 2.

In this condition, the angular position of the output shaft 17 of the electric actuator 1 is adjusted to correspond to the P range, and the actual shift range of the shift range switching device 3 is also adjusted to the P range, so that the output shaft 17 of the electric actuator 1 is in the detachable condition. Specifically, the three devices on the side of the electric actuator 1 including the key X1, the latching piece Z1, and the non-groove portion Y1 are aligned in substantially the same direction, and the two devices on the side of the automatic transmission 2 including the key groove X2 and the non-tooth portion Y2 are aligned in substantially the same direction, so that the electric actuator 1 can be attached to the automatic transmission 2.

Thus, even when the electrical actuator 1 is detached and attached for maintenance or the like, the previous shift range (P range) stored in the memory when supplying electricity is terminated can be steadily matched to the actual shift range (P range) of the shift range switching device 3 after attaching the electrical actuator 1.

Thus, the vehicle can be restricted from accidentally moving due to the deviation, i.e., mismatching between the recognized shift range and the actual shift range after the electric actuator 1 is detached and attached. In this example embodiment, the shift range switching apparatus includes the automatic transmission and the electric actuator. The automatic transmission includes the shift range switching device for operating the actual shift range corresponding to the rotation angle of the control rod. The electric actuator includes the output shaft connected to the control rod. The electric actuator switches the actual shift range by rotating the output shaft. The shift range switching apparatus includes the assembly regulating device that allows the electric actuator to be attached to and detached from the automatic transmission only when the actual shift range of the shift range switching device is set at the specific shift range.

In this structure, the electric actuator can be restricted from causing mismatch relative to the shift range switching device when the electric actuator is attached to the automatic transmission.

(Modification)

The rotative direction of the rotor 11, the rotation speed of the rotor 11, the rotation amount of the rotor 11, and the rotation angle of the rotor 11 may be controlled by counting the number of supplying electricity to each excitation coil 22, instead of providing the rotor angle detecting unit 7.

The rotation angle of the output shaft 17 can be calculated in accordance with the count value of the rotor angle detecting unit 7, instead of providing the output angle detecting unit 8. The rotor angle detecting unit 7 and output angle detecting unit 8 may be omitted. In this case, the rotation angle of the output shaft 17 can be calculated in accordance with the rotative direction of the rotor 11, the rotation amount of the rotor 11, and the rotation angle of the rotor 11 by counting the number of supplying electricity to each excitation coil 22.

The shift range position (actual shit range) of the shift range switching device 3 may be directly detected, so that the electric actuator 1 can be controlled in accordance with the shift range position (actual shit range) of the shift range switching device 3.

The electric motor 5 is not limited to the SR motor. The electric motor 5 may be various kinds of motors such as a reluctance motor and a permanent magnet synchronous motor. The reluctance motor may be a synchronous reluctance motor. The permanent magnet synchronous motor may be a surface permanent magnet synchronous motor (SPM), or an interior permanent magnet synchronous motor (IPM).

The reduction gears 6 are not limited to the inscribed planetary reduction gear (cycloidal gears). A planetary reduction gear constructed of the sun gear 26, planetary pinions, a ring gear, and the like may be used as the reduction gears 6. In this structure, the sun gear 26 may be rotated by the rotor shaft 13. The planetary pinions may be arranged along the circumferential periphery of the sun gear 26 at regular intervals. The ring gear engages with the circumferential periphery of the planetary pinion.

The reduction gears 6 may be a reduction device other than a planetary reduction gear. The reduction gears 6 may be a reduction device constructed by combining multiple gears rotated using the rotor shaft 13, or the like.

The structure of the shift range switching apparatus is not limited to combination of the electric motor 5 and the reduction gears 6. The electric motor 5 may drive a rotated object in the shift range switching apparatus without using the reduction gears 6.

Various modifications and alternations may be diversely made to the above embodiments without departing from the spirit of the present invention.

What is claimed is:

1. A shift range switching apparatus comprising:
    an automatic transmission that includes a shift range switching device having a control rod for switching an actual shift range corresponding to rotation angle of the control rod;
    an electric actuator that includes an electric motor and an output shaft connecting with the control rod, the electric actuator switching the actual shift range by rotating the control rod via the output shaft;
    an assembly regulating device that allows the electric actuator to be detachable from and attachable to the automatic transmission when the actual shift range of the shift range switching device is set at a specific shift range;

a motor controller that controls rotation angle of the output shaft by operating the electric motor;
a transmission housing; and
an electric actuator housing for accommodating the electric actuator,
wherein the motor controller operates the actual shift range by controlling rotation angle of the control rod,
the motor controller includes a startup shift range recognizing unit that stores a position of the shift range in a memory when supplying electricity to the motor controller is terminated,
the startup shift range recognizing unit restores the position of the shift range stored in the memory when supplying electricity to the motor controller is resumed, thereby recognizing the position of the shift range,
wherein the assembly regulating device allows the control rod to be detachable from and attachable to the output shaft at only one angle,
one of the control rod and the output shaft has a non-groove portion,
an other of the control rod and the output shaft has a non-tooth portion,
one of the electric actuator housing and the transmission housing includes a boss having an end provided with a stopper,
the stopper enables the control rod and the output shaft to be assembled to the boss only when both the non-groove portion and the non-tooth portion are in a predetermined position of the shift range.

2. The shift range switching apparatus according to claim 1,
wherein the control rod and the output shaft have a center axis, and
the assembly regulating device allows the electric actuator to be detachable from and attachable to the automatic transmission when each of the transmission housing, the electric actuator housing, the control rod, and the output shaft is in a specific angular position with respect to the center axis.

3. The shift range switching apparatus according to claim 2,
wherein the assembly regulating device includes a first regulating device, a second regulating device, and a third regulating device,
the first regulating device allows the transmission housing to be connected with the electric actuator housing in a specific position,
the second regulating device allows the control rod to be engaged with the output shaft via a spline in a specific angular position,
the one of the transmission housing and the electric actuator housing accommodates the one of the control rod and the output shaft having the non-groove portion, and
the stopper regulates an insertion position of the non-tooth portion.

4. The shift range switching apparatus according to claim 2,
wherein the assembly regulating device includes a first regulating device, and
the first regulating device allows the transmission housing to be connected with the electric actuator housing in a specific position.

5. The shift range switching apparatus according to claim 4,
an other of the electric actuator housing and the transmission housing has an assembly hole,
the first regulating device includes a key and a key groove,
the key is a protrusion that axially extends on one of an outer circumferential periphery of the boss and an inner circumferential periphery defining the assembly hole,
the key groove is a recession that axially extends in an other of the outer circumferential periphery of the boss and the inner circumferential periphery defining the assembly hole, and
the boss is attachable to the assembly, hole by engaging the key with the key groove.

6. The shift range switching apparatus according to claim 5, wherein the first regulating device inhibits the boss from being engaged with the assembly hole without matching the key with the key groove.

7. The shift range switching apparatus according to claim 5,
wherein the assembly regulating device further includes a second regulating device,
the second regulating device allows the control rod to be engaged with the output shaft via a spline in a specific angular position.

8. The shift range switching apparatus according to claim 7,
wherein the one of the control rod and the output shaft has an inner circumferential periphery defining a plurality of spline grooves circumferentially arranged at substantially regular intervals excluding the non-groove portion,
the other of the control rod and the output shaft has an outer circumferential periphery defining a plurality of spline teeth circumferentially arranged at substantially regular intervals excluding the non-tooth portion, and
the control rod is attachable to the output shaft by respectively engaging the non-tooth portion and the plurality of spline teeth with the non-groove portion and the plurality of spline grooves.

9. The shift range switching apparatus according to claim 8,
wherein the non-groove portion is defined by omitting at least one of the plurality of spline grooves, which are circumferentially arranged, and
the non-tooth portion is defined by omitting at least one of the plurality of spline teeth, which are circumferentially arranged.

10. The shift range switching apparatus according to claim 8, wherein the second regulating device inhibits the output shaft from being engaged with the control rod without matching the non-groove portion with the non-tooth portion.

11. The shift range switching apparatus according to claim 8,
wherein the assembly regulating device further includes a third regulating device,
the stopper is provided to one of the transmission housing and the electric actuator housing accommodates the one of the control rod and the output shaft having the non-groove portion, and
the stopper regulates an insertion position of the non-tooth portion.

12. The shift range switching apparatus according to claim 11,
wherein the stopper regulates the insertion position of the non-tooth portion when the plurality of spline grooves of the output shaft are inserted to the plurality of spline teeth of the control rod.

13. The shift range switching apparatus according to claim 12, wherein the stopper at least partially overlaps the non-groove portion with respect to the axial direction of the output shaft when the plurality of spline teeth are engaged with the plurality of spline grooves.

14. The shift range switching apparatus according to claim 13, wherein the stopper and the non-groove portion are arranged substantially in the same angular position when the plurality of spline teeth are engaged with the plurality of spline grooves.

15. The shift range switching apparatus according to claim 12, wherein the stopper inhibits the output shaft from being engaged with the control rod without matching the stopper with both the non-groove portion and the non-tooth portion.

16. The shift range switching apparatus according to claim 12,
wherein the control rod has an outer circumferential periphery defining an annular groove, which circumferentially extends in the outer circumferential periphery of the control rod, and
the annular groove restricts the stopper from making contact with the control rod when the control rod is rotated in a condition when the output shaft is assembled with the control rod via the spline.

17. The shift range switching apparatus according to claim 1,
wherein the electric actuator is detachable from and attachable to the automatic transmission when the following conditions are satisfied:
the output shaft of the electric actuator is in an angular position corresponding to a P range of the automatic transmission; and
the shift range switching device is set at the P range.

18. A shift range switching apparatus comprising:
an automatic transmission that includes a shift range switching device having a control rod for switching a shift range corresponding to rotation angle of the control rod, the automatic transmission being accommodated in a transmission housing;
an electric actuator that includes an electric motor and an output shaft connecting with the control rod, the electric actuator being accommodated in an actuator housing, the electric actuator switching the shift range by rotating the control rod via the output shaft; and
an assembly regulating device that allows the electric actuator to be detachable from and attachable to the automatic transmission when angular positions of all the transmission housing, the actuator housing, the control rod, and the output shaft are at a specific angular position that corresponds to a specific shift range;
a motor controller that controls rotation angle of the output shaft by operating the electric motor,
the transmission housing; and
an electric actuator housing for accommodating the electric actuator,
wherein the motor controller operates the actual shift range by controlling rotation angle of the control rod,
the motor controller includes a startup shift range recognizing unit that stores a position of the shift range in a memory when supplying electricity to the motor controller is terminated, and
the startup shift range recognizing unit restores the position of the shift range stored in the memory when supply electricity to the motor controller is resumed, thereby recognizing the position of the shift range,
wherein the assembly regulating device allows the control rod to be detachable from and attachable to the output shaft at only one angle,
one of the control rod and the output shaft has a non-groove portion,
an other of the control rod and the output shaft has a non-tooth portion,
one of the electric actuator housing and the transmission housing includes a boss having an end provided with a stopper,
the stopper enables the control rod and the output shaft to be assembled to the boss only when both the non-groove portion and the non-tooth portion are in a predetermined position of the shift range.

19. A method for assembling a shift range switching apparatus comprising:
storing a position of a shift range of an automatic transmission in a memory;
terminating electricity supplied to a controller that controls an electric actuator for operating a shift range switching device to switch the shift range of the automatic transmission;
detaching the automatic transmission from the electric actuator by correspondingly removing a transmission housing and a control rod of the shift range switching device from an actuator housing and an output shaft of the electric actuator;
adjusting angular positions of all the transmission housing, the actuator housing, the control rod, and the output shaft at a specific angular position that corresponds to a specific shift range;
attaching the automatic transmission to the electric actuator by engaging the control rod with the output shaft at only one angle via an assembly regulating device to correspondingly connect the transmission housing and the control rod with the actuator housing and the output shaft;
resuming electricity supply to the controller; and
restoring the position of the shift range stored in the memory
wherein one of the control rod and the output shaft has a non-groove portion,
an other of the control rod and the output shaft has a non-tooth portion,
the transmission housing includes a boss having an end provided with a stopper, and
the stopper enables insertion of the control rod relative to the output shaft only when both the non-groove portion and the non-tooth portion are in a predetermined position of the shift range.

20. A shift range switching apparatus comprising:
an automatic transmission that includes a shift range switching device having a control rod for switching an actual shift range corresponding to rotation angle of the control rod;
an electric actuator that includes an output shaft connecting with the control rod, the electric actuator switching the actual shift range by rotating the control rod via the output shaft; and
an assembly regulating device that allows the electric actuator to be detachable from and attachable to the automatic transmission when the actual shift range of the shift range switching device is set at a specific shift range,
wherein the shift range switching device is provided with a transmission housing,
the electric actuator is accommodated in an electric actuator housing,
the control rod and the output shaft have a center axis, and the assembly regulating device allows the electric actuator to be detachable from and attachable to the automatic transmission when each of the transmission housing, the electric actuator housing, the control rod, and the output shaft is in a specific angular position with respect to the center axis, wherein the assembly regulating device includes a first regulating device, and the first regulating device allows the transmission housing to be connected with the electric actuator housing in a specific position, wherein one of the electric actuator housing and the transmission housing includes a boss, an other of the electric actuator housing and the transmission housing has an assembly hole, the first regulating device includes a key and a key groove, the key is a protrusion that axially extends on one of an outer circumferential periphery of the boss and an inner circumferential periphery defining the assembly hole, the key groove is a recession that axially extends in an other of the outer circumferential periphery of the boss and the inner circumferential periphery defining the assembly hole, and the boss is attachable to the assembly hole by engaging the key with the key groove, wherein the assembly regulating device further includes a second regulating device, the second regulating device allows the control rod to be engaged with the output shaft via a spline in a specific angular position, one of the control rod and the output shaft has a non-groove portion, and an other of the control rod and the output shaft has a non-tooth portion, wherein the one of the control rod and the output shaft has an inner circumferential periphery defining a plurality of spline grooves circumferentially arranged at substantially regular intervals excluding the non-groove portion, the other of the control rod and the output shaft has an outer circumferential periphery defining a plurality of spline teeth circumferentially arranged at substantially regular intervals excluding the non-tooth portion, and the control rod is attachable to the output shaft by respectively engaging the non-tooth portion and the plurality of spline teeth with the non-groove portion and the plurality of spline grooves, wherein the assembly regulating device further includes a third regulating device, the third regulating device is provided to one of the transmission housing and the electric actuator housing, which accommodates the one of the control rod and the output shaft having the non-groove portion, and the third regulating device regulates an insertion position of the non-tooth portion, wherein the third regulating device is a stopper that is provided to an end of the one of the transmission housing and the electric actuator housing, and the stopper regulates the insertion position of the non-tooth portion when the plurality of spline grooves of the output shaft are inserted to the plurality of spline teeth of the control rod, wherein the stopper inhibits the output shaft from being engaged with the control rod without matching the stopper with both the non-groove portion and the non-tooth portion.

21. A shift range switching apparatus comprising:
an automatic transmission that includes a shift range switching device having a control rod for switching an actual shift range corresponding to rotation angle of the control rod;

an electric actuator that includes an output shaft connecting with the control rod, the electric actuator switching the actual shift range by rotating the control rod via the output shaft; and an assembly regulating device that allows the electric actuator to be detachable from and attachable to the automatic transmission when the actual shift range of the shift range switching device is set at a specific shift range, wherein the shift range switching device is provided with a transmission housing, the electric actuator is accommodated in an electric actuator housing, the control rod and the output shaft have a center axis, and the assembly regulating device allows the electric actuator to be detachable from and attachable to the automatic transmission when each of the transmission housing, the electric actuator housing, the control rod, and the output shaft is in a specific angular position with respect to the center axis, wherein the assembly regulating device includes a first regulating device, and the first regulating device allows the transmission housing to be connected with the electric actuator housing in a specific position, wherein one of the electric actuator housing and the transmission housing includes a boss, an other of the electric actuator housing and the transmission housing has an assembly hole, the first regulating device includes a key and a key groove, the key is a protrusion that axially extends on one of an outer circumferential periphery of the boss and an inner circumferential periphery defining the assembly hole, the key groove is a recession that axially extends in an other of the outer circumferential periphery of the boss and the inner circumferential periphery defining the assembly hole, and the boss is attachable to the assembly hole by engaging the key with the key groove, wherein the assembly regulating device further includes a second regulating device, the second regulating device allows the control rod to be engaged with the output shaft via a spline in a specific angular position, one of the control rod and the output shaft has a non-groove portion, and an other of the control rod and the output shaft has a non-tooth portion, wherein the one of the control rod and the output shaft has an inner circumferential periphery defining a plurality of spline grooves circumferentially arranged at substantially regular intervals excluding the non-groove portion, the other of the control rod and the output shaft has an outer circumferential periphery defining a plurality of spline teeth circumferentially arranged at substantially regular intervals excluding the non-tooth portion, and the control rod is attachable to the output shaft by respectively engaging the non-tooth portion and the plurality of spline teeth with the non-groove portion and the plurality of spline grooves, wherein the assembly regulating device further includes a third regulating device, the third regulating device is provided to one of the transmission housing and the electric actuator housing, which accommodates the one of the control rod and the output shaft having the non-groove portion, and the third regulating device regulates an insertion position of the non-tooth portion, wherein the third regulating device is a stopper that is provided to an end of the one of the transmission housing and the electric actuator housing, and the stopper regulates the insertion position of the non-tooth portion when the plurality of spline grooves of the output shaft are inserted to the plurality of spline teeth of the control rod, wherein the control rod has an outer circumferential periphery defining an annular groove, which circumferentially extends in the outer circumferential periphery of the control rod, and the annular groove restricts the stopper from making contact with the control rod when the control rod is rotated in a condition when the output shaft is assembled with the control rod via the spline.

22. The shift range switching apparatus according to claim 1, wherein the predetermined position is P range.

23. The shift range switching apparatus according to claim 18, wherein the predetermined position is P range.

* * * * *